(12) United States Patent
Andersen et al.

(10) Patent No.: US 7,984,183 B2
(45) Date of Patent: Jul. 19, 2011

(54) DISTRIBUTED DATABASE SYSTEM USING MASTER SERVER TO GENERATE LOOKUP TABLES FOR LOAD DISTRIBUTION

(75) Inventors: Frank-Uwe Andersen, Berlin (DE); Michael Duelli, Würzburg (DE); Tobias Hoβfeld, Würzburg (DE); Gerald Neitzert, Wiesloch (DE); Simon Oechsner, Gerbrunn (DE); Wolfgang Scheidl, Bernhardswald (DE); Phuoc Tran-Gia, Würzburg (DE); Kurt Tutschku, Vienna (AT)

(73) Assignee: Nokia Siemens Networks Oy, Espoo (FI)

( * ) Notice: Subject to any disclaimer, the term of this patent is extended or adjusted under 35 U.S.C. 154(b) by 314 days.

(21) Appl. No.: 12/337,231

(22) Filed: Dec. 17, 2008

(65) Prior Publication Data

US 2009/0157684 A1    Jun. 18, 2009

(30) Foreign Application Priority Data

Dec. 17, 2007   (EP) ...................................... 07150065

(51) Int. Cl.
*G06F 15/173*   (2006.01)
(52) U.S. Cl. ........................ 709/244; 709/242; 709/238
(58) Field of Classification Search .................. 709/238, 709/239, 240, 241, 242, 243, 244, 225, 226; 707/770; 370/392
See application file for complete search history.

(56) References Cited

U.S. PATENT DOCUMENTS

| | | |
|---|---|---|
| 6,950,848 B1 | 9/2005 | Yousefi'zadeh |
| 6,990,102 B1 * | 1/2006 | Kaniz et al. .................. 370/392 |
| 2002/0049762 A1 * | 4/2002 | Shah et al. .................... 707/770 |
| 2002/0083174 A1 * | 6/2002 | Hayashi et al. ............... 709/225 |
| 2005/0114862 A1 | 5/2005 | Bisdikian et al. |
| 2006/0168107 A1 | 7/2006 | Balan et al. |
| 2008/0040509 A1 * | 2/2008 | Werb et al. .................... 709/242 |
| 2008/0130627 A1 * | 6/2008 | Chen et al. .................... 370/351 |

OTHER PUBLICATIONS

Search Report for European Patent Application No. 07150065.6, completed Apr. 18, 2008; 7 pages.

* cited by examiner

*Primary Examiner* — Le Luu
(74) *Attorney, Agent, or Firm* — Alston & Bird LLP

(57) ABSTRACT

A state change in a network comprising a master server among a plurality of servers is determined, at the master server, a first lookup table is calculated, said first lookup table indicating respective partitions of a second lookup table distributed among active servers of said plurality of servers, the calculated first lookup table is distributed to each active server, and based on the first lookup table, at the master server, a modified partition of the second lookup table is generated.

38 Claims, 12 Drawing Sheets

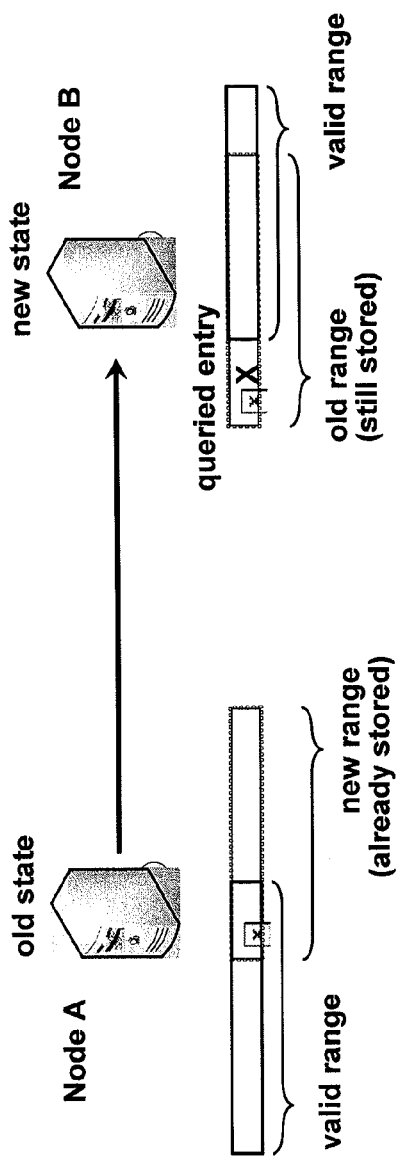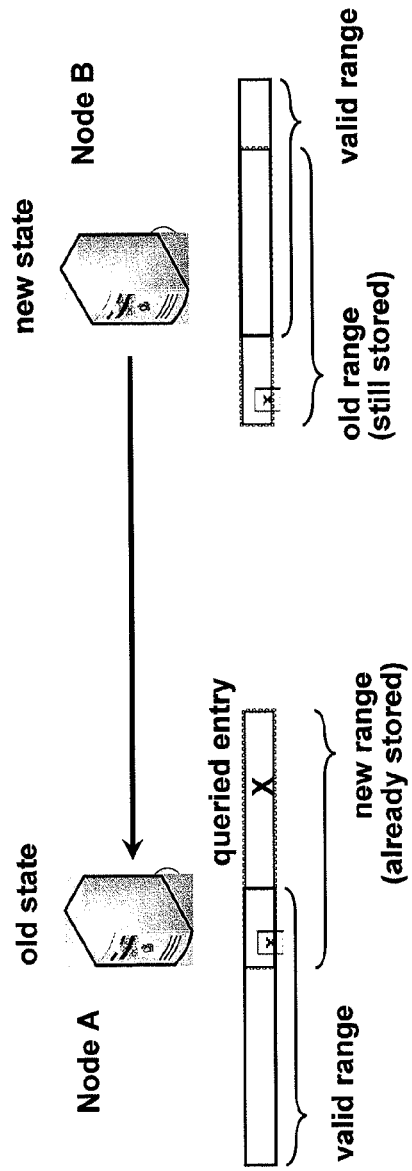

DISTRIBUTED DATABASE SYSTEM USING MASTER SERVER TO GENERATE LOOKUP TABLES FOR LOAD DISTRIBUTION

CROSS-REFERENCE TO RELATED PATENT APPLICATIONS

European Patent Office Priority Application EP 07150065.6, filed Dec. 17, 2007, including the specification, drawings, claims and abstract, is incorporated herein by reference in its entirety.

FIELD OF THE INVENTION

The present invention relates to distributed database or application server systems, in particular a front-end layer of such systems.

BACKGROUND OF THE INVENTION

In a distributed database system, for example, where data is distributed over several database servers instead of being located in one single server, a lookup is required to route requests for a specific data item to a matching server that stores the item. This is usually implemented using "front-end" servers, much in the same way as multi-tier web server applications. They are separated from "back-end" servers that hold actual data (or applications).

In the case of databases, pointers to the back-end database servers are stored in what is called a "lookup system" or "front-end system". These pointers are generally of a format <key, value>, where the key is a valid search key for a back-end database, and the value is an address of a back-end server where a corresponding data set is located.

Thus, when a query, e.g. an LDAP (Lightweight Directory Access Protocol) command, is issued to the distributed database system, it is first resolved in the front-end system, and then forwarded to the correct address in the back-end system, where it can be processed.

In a mobile operator environment, several locations exist where such multi-tier approach can be used, e.g. HLR (Home Location Register), Radius (Remote Authentication Dial-In User Service), Charging, Network Management, IMS (Internet Protocol Multimedia Subsystem), and web servers.

Recently, there is a trend in mobile network database design to create only one logical database that physically runs on a multitude of servers and also unifies different types of databases, for example, HLR, Radius, OAM DB (Operation And Maintenance DataBase), NM (Network Management) DB, charging DB, etc.

SUMMARY OF THE INVENTION

The present invention aims at providing a load distribution mechanism in a distributed storage system without full redundancy when a new device is added to the system or a device of the system fails, for example.

This is achieved by methods and servers as defined in the appended claims. The invention may also be implemented as a computer program product.

In a distributed storage system without full redundancy, i.e. where there is not a copy of every data set on every server, single or multiple server failures are likely to result in less evenly distributed system load and also losses of data. The latter happens if all servers storing a specific set of data fail, with the number of these servers depending on the storage and redundancy policy of the system.

However, even if there is no loss of data in such a distributed data storage system, but load is not distributed evenly anymore, this may still be a problem for the system. Depending on the dimensioning of the servers, those that have to handle a higher load may become overloaded or may only be able to offer their service with less quality.

The present invention provides a self-reorganizing mechanism which automatically re-organizes load distributed in a distributed database or application server system, in particular a distributed query routing system. In prior art non-full-redundancy systems a situation of uneven load distribution is not corrected by the system itself but by manual intervention.

In contrast, the present invention provides a self-organizing architecture which helps to reduce a time span during which load inequality occurs. The self-organizing architecture of the invention requires less human control and intervention.

The present invention deals with a situation when load, e.g. a new server, is added to a network of front-end database servers, or one server in the network suddenly fails. According to the invention, instead of storing a complete lookup table (i.e. a collection of pointers, indicating where data items are located in back-end servers) in every front-end server, each front-end server only needs to keep a portion of the lookup table and a first lookup table as a kind of a "partitioning table" which indicates which front-end server is responsible for which section of data stored in the back-end servers, i.e. which part of lookup table is located in which front-end server.

According to an embodiment of the invention, each front-end database server is assigned an ID and the one with the lowest ID in a network ring of front-end database servers is deemed as ring master. Whenever a server is added to the network or a server fails, the ring master will be informed by other server(s) or notice the situation itself. The ring master calculates a new "partitioning table" based on the currently available servers, indicating which server is responsible for which section of the data stored at the back-end servers, i.e. a starting point and an end point in the "partitioning table" for each server or the boundary in the "partitioning table" between each section.

The ring master distributes the new "partitioning table" to each server. Each server updates its own "partitioning table" and sends an acknowledgment to the ring master after the updating is accomplished. Such update procedure may be performed by each server in periodic cycles.

The ring master issues a "lock" instruction to each server. After that each server can still finish an ongoing writing process and respond to read requests, but it cannot take any new write request. Each server then follows the "lock" instruction, finishes any pending local "write" operation, if any, and acknowledges to the ring master that it is locked.

The ring master instructs each server to switch to the new partitioning table. Each server sends an acknowledgment to the ring master after its switch. Finally, the ring master unlocks all the servers.

A major problem in distributed query routing systems with large (i.e. millions of entries) lookup tables is the synchronization of these tables among the participating servers, especially when they fail or new ones join the system. Derived from this, there is a second problem of equally loading the servers after server failures or when new servers have been added. The present invention addresses the problems by a three-stage synchronization mechanism which takes also into account that multiple changes may occur.

As described above, the problems are solved by first selecting a "ring master" server which guides acquisition of a state of the overall ring and mapping of ID ranges to the responsible servers. In particular, multiple changes, e.g. failures or added servers, are considered, allowing re-organisation only under certain conditions.

The present invention provides a distributed mechanism to equally distribute load after a system change, such as one or multiple server failures or an addition of new servers to the system. The distributed mechanism may be based on a lookup system that uses a hash-based addressing scheme to ensure that each server stores the same amount of data in a stable state, thereby equally distributing the number of queries each server receives. In case a change occurs in the system state, the re-organization mechanism of the invention will automatically assign new data ranges to each server that is still in active state or operation.

The new ranges are again of approximately the same size and reflect the new situation, i.e., the number of remaining or added servers. After it has been calculated which server will be responsible for which part of the overall data set, and after each server has downloaded the data in these ranges (taking into account the data it already had availably locally before the change), the system can switch to a new state which is load balanced and stable.

According to the invention, the amount of data to be transferred during the reorganization phase(s) is kept as small as possible.

BRIEF DESCRIPTION OF THE DRAWINGS

FIG. 10 shows a schematic diagram illustrating routing between servers in different states.

FIG. 11 shows a schematic diagram illustrating routing between servers in different states.

DETAILED DESCRIPTION OF CERTAIN EMBODIMENTS

According to an embodiment of the invention it is assumed that content of a content storage system consists of a large number of documents or files and is stored with only partially redundancy on a number of servers which forward queries among themselves in order to resolve them with a defined upper bound of query forwarding. Load distribution in such a system is achieved by distributing the content equally among the set of servers, assuming that all documents or files are equally popular and therefore queried equally often, which is typical of HLR, for example.

This may be achieved by storing data according to the principle of Distributed Hash Tables (DHT), which means that all documents as well as addresses of the servers are hashed to an identifier space and documents are stored on the server with the lowest ID that is still larger than their own ID. As a consequence, each server is responsible for a continuous range of the identifier space and the documents that fall into this range. The servers form a logical structure (so-called overlay) that is used to identify the storage location of a specific document.

The total amount of lookup data is not stored fully redundant on every front-end node (which would require large amounts of memory in the front-end nodes), but is partitioned and distributed partially redundant among all the front-end devices that make up the lookup system, thus decreasing the amount of memory needed on each front-end device to only a fraction (that fraction being dependent on the amount of redundancy).

It is to be noted that the term "device" comprises an entity such as an application, server and node, for example.

Two data structures (lookup tables) and two (lookup) processes may be provided in order to route incoming queries which reach an arbitrary front-end device, e.g. by an automatic switch.

The first data structure is a small routing or "partitioning" table referred to as first lookup table. It contains a table with a first column of IDs of known front-end nodes of the distributed database system, and a second column that shows which intervals the front-end nodes are responsible for. These intervals are parts of what is usually called "hash space", e.g. all numbers from 0 to $2^n$. The intervals are evenly spaced, so that later on, the load on each of the front-end devices is the same. If the set of front-end devices is heterogeneous in capacity, the intervals can also be split according to the individual capacity of the devices. Depending on the result of the hash function, i.e. a transformation of input data obtained from a database query message, it is immediately derivable from the first data structure which interval this query belongs to, and accordingly, which front-end device is responsible for this query. After this, a second lookup process is started, involving a second data structure.

Figure 1:
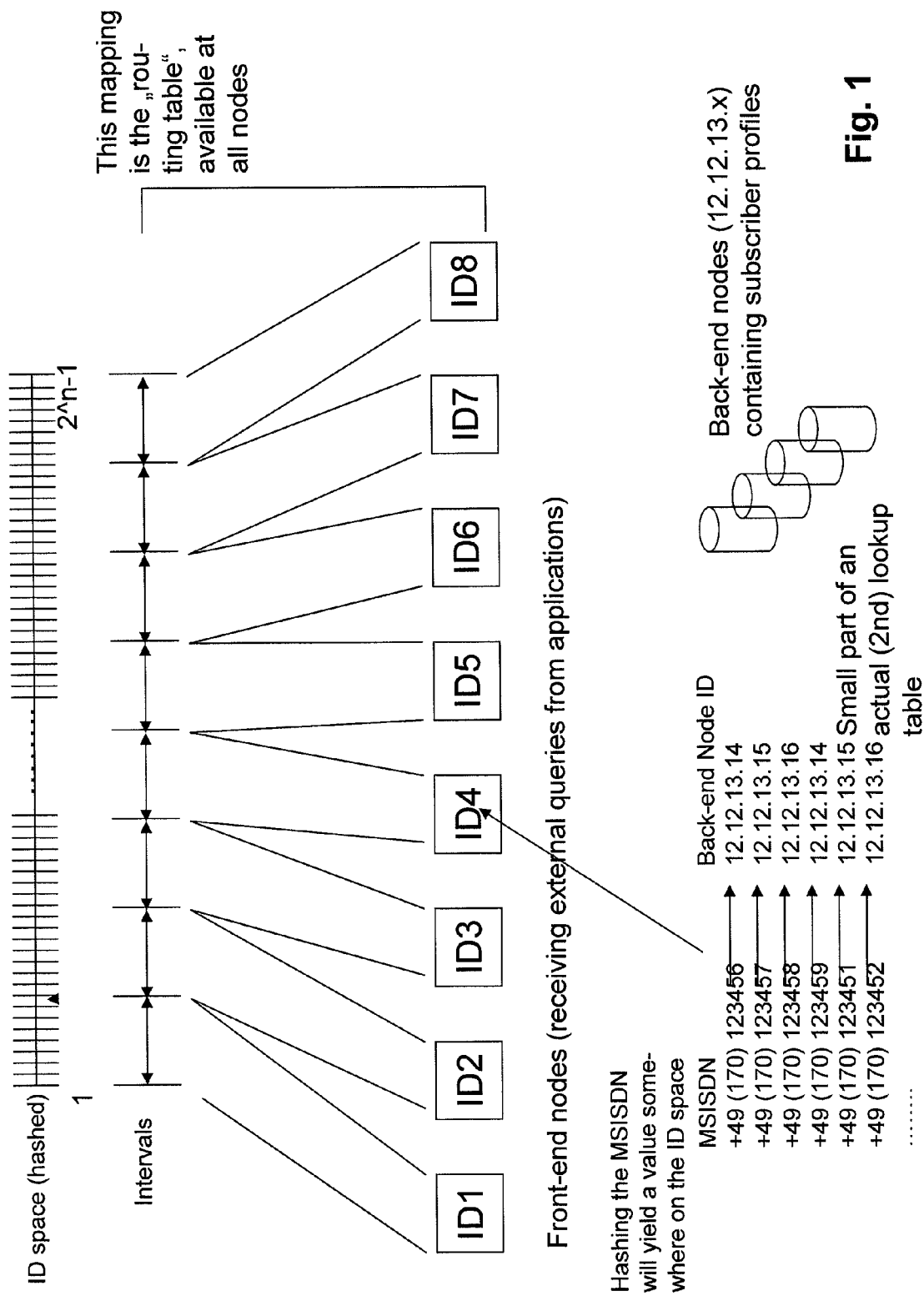
FIG. 1 shows mapping between sections of data stored in back-end devices and front-end devices according to an embodiment of the invention.

FIG. 1 shows a mapping between sections of data, which is stored in back-end devices, and front-end devices. Front-end nodes having IDs, from ID1 to ID8, are responsible for intervals in a hashed ID space including all numbers from 1 to $2^{n-1}$. Hashing an MSISDN contained in a query message received at an arbitrary one of the front-end nodes yields a value in the hashed ID space. For example, a front-end node ID4 receives the query message with MSISDN +49(170) 123456, querying a subscriber profile. Hashing this MSISDN yields a value in the ID space which belongs to the interval which front-end node ID1 is responsible for (as illustrated by the black triangle in the upper left part of FIG. 1 in the hashed ID space). Thus, node ID4 knows from the first lookup table stored at each node ID1 to ID8 that the front-end node ID1 stores the part of an actual second lookup table which is necessary for deriving a back-end node which contains the queried subscriber profile for the MSISDN +49(170)123456.

Figure 2:
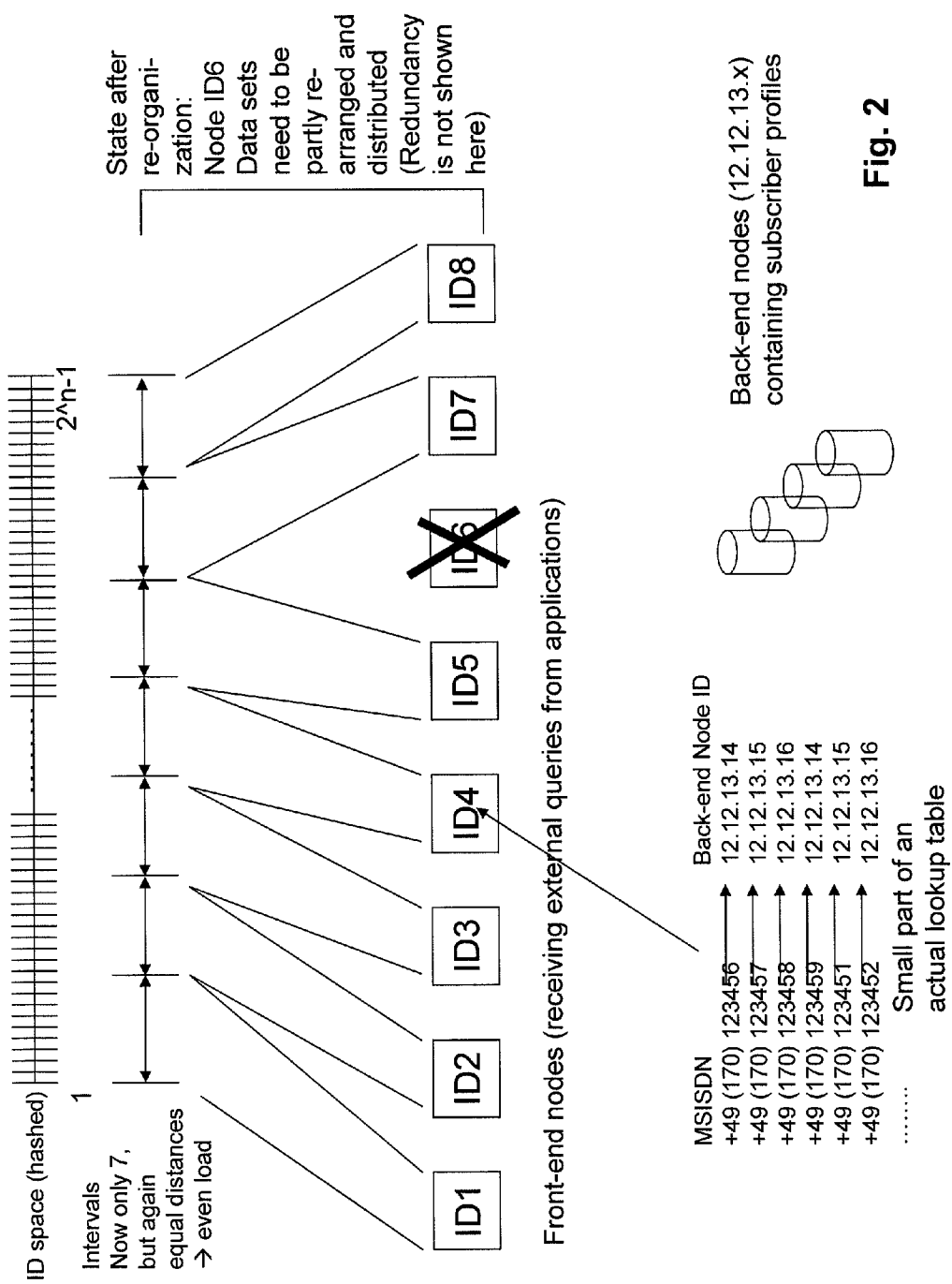
FIG. 2 shows a change in mapping between the sections of data and the front-end devices in FIG. 3 in case of removal or failure of a front-end device.

FIG. 2 shows a change in mapping between the sections of lookup data and the front-end devices in FIG. 1 in case of removal or failure of a front-end device. As shown in FIG. 2, front-end node ID6 is removed. After re-organization, data sets (i.e. sections of data) which the front-end node ID6 has been responsible for are partly rearranged and distributed to the other front-end nodes. Now there are only seven intervals instead of eight intervals in FIG. 1. However, the hashed ID space again is evenly distributed between the front-end nodes.

It is to be noted that FIGS. 1 and 2 do not show redundancy of responsibilities and/or lookup tables for reasons of keeping the illustration and description simple.

Figure 3:
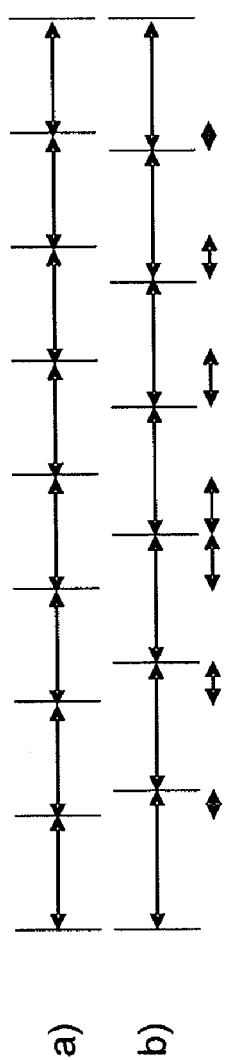
FIG. 3 shows intervals of front-end device responsibility after removal or failure of one front-end device.

FIG. 3 shows intervals of the front-end node responsibility before (FIG. 3a) and after (FIG. 3b) removal of front-end node ID6.

The second data structure, i.e. the second lookup table is typically a large lookup table with millions of entries, whereas the routing or partitioning table i.e. the first lookup table used in the first process only contains as many entries as there are front-end nodes. The second data structure consists of a column containing keys, and one column containing values. As described above, the keys may be a hashed MSISDN for example, and the values may be Node IDs of HLR back-end servers. (Hashing means applying a Hash function to an input value such as MSISDN.) When searching locally, a front-end node will hash the MSISDN and based thereon find the corresponding, correct back-end server Node ID. This is possible because the described $2^{nd}$ lookup table structure is stored in the standard "hash table" memory data structure. The front-end server will then retrieve the data from the identified back-end server and return it to the front-end server receiving the query.

FIG. 3 shows the responsibility intervals from FIGS. 1 and 2, and the arrows mark where the devices' responsibilities overlap before and after removal of front-end node ID6. Where there is an overlap between (a) the old interval and (b) the new interval, obviously no data has to be transferred from other devices to the local device.

Assume we have 8 front-end servers (FIGS. 1, 3a). One fails or one is added, which makes the total number of active servers become 7 (FIGS. 2, 3b) or 9 (this example is not shown; however, under the assumption that FIG. 3b shows a situation of 7 servers to which an eighth server is added, this is then reflected in FIG. 3b, 3a). In such a case, a master server (MS) reallocates the pointers (second lookup table) in each active server. Such mechanism is for example like this: From its (current) routing table (first lookup table), the MS is aware of the whole (hashed) address space. So, the new first lookup table is generated by re-dividing address space e.g. address space/7 or 9, in other words, each active front-end server has a new corresponding value range. The master server distributes the new routing table to all the active servers. Based on the old and new routing tables, each active front-end server then knows from where it can get some pointers so as to update its current second lookup table in accordance to the new routing table. Stated in other words, the master server distributes a new ring state for the "ring" of the active front-end servers (placed (as a modeling approach only) on the ring of the hashed ID space) after its computation. This new state comes in the form of a mapping from (old server addresses & IDs) to new address space defined by respective IDs (start ID and end ID) for every server. The complete mapping is transmitted to every front-end server. A newly added front-end server can therefore extract the old routing table from this mapping and determine from which servers it can retrieve the pointers it needs in the new state.

Thus, the calculated first lookup table comprises apart from the routing information as such also mapping information between the first lookup table after and before the detected state change.

FIG. 3 is mainly related to the routing table, i.e. the first of the two data structures and stages of the process.

As described above, a hash-based addressing scheme may be used to ensure that load generated by lookup queries (e.g. LDAP requests) is evenly distributed and that every lookup entry stored on a front-end device can be found.

Figure 4:
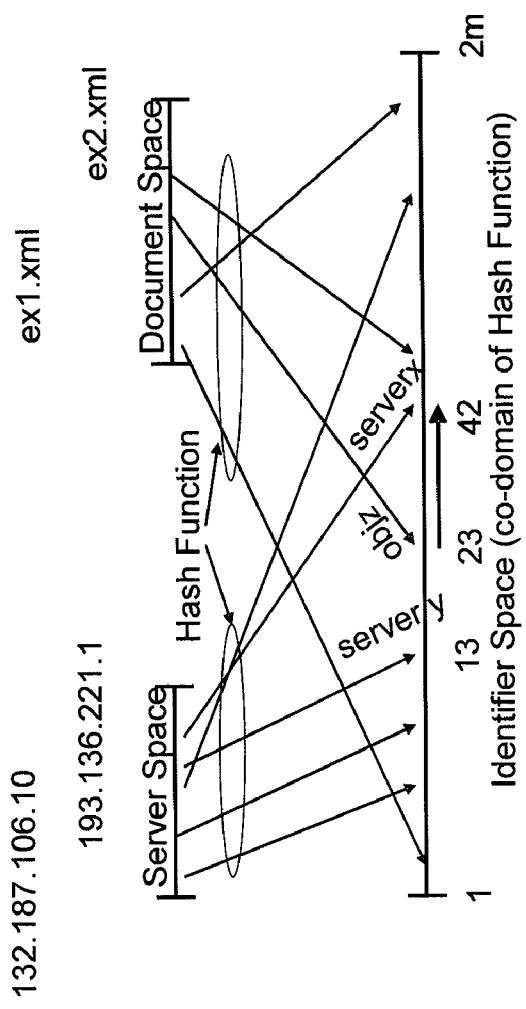
FIG. 4 shows a schematic diagram illustrating front-end device and data placement in an identifier space according to an embodiment of the invention.

Each data item is placed in the overlay by hashing a search key of an original database query (e.g., an MSISDN in a subscriber database). This hash value is at the same time a key for a <key, value> pair of a corresponding lookup entry in a lookup table. In addition, each device has its own overlay address, which is its position in the ID space. The addresses of all devices determine how much of the total lookup data each device has to store. FIG. 4 shows device and data placement in the ID (identifier) space. Each object is stored at a first peer succeeding the objects hash value.

Shown in FIG. 4 is the basic working mechanism of a hash function, as used for example in the present case in connection with DHTs (Distributed Hash Tables). It maps input values (in this example IP addresses of servers or document names) to its co-domain, which is used as the identifier space in the DHT context. In this figure, the co-domain of the hash function is a linear space, ranging from 1 to 2 m. This is in principle an equally viable value as the [1; $2^n-1$] interval used as an example in the present invention in FIGS. 1 and 2. Other variants, such as two coordinates, are also possible.

It is important to note that in this figure, servers are mapped onto the identifier space via the same function in contrast to this invention. However, this is a known and used practice in many DHTs, where a much larger number of servers is used and therefore a quick, collision-free and inexpensive ID generation is needed. Due to the randomness of many hash functions, the positioning of the servers is also random when using this method, which is in part remedied again by the higher number of servers. However, according to this invention, this does not hold, which is why in this invention servers are placed not randomly, but deterministically following the described algorithms. The placement of lookup entries in the present invention is also done based on a hash function applied to the database key that is queried, since the sheer number of entries is sufficient to lead to an equal distribution of entries among the servers.

Figure 5:
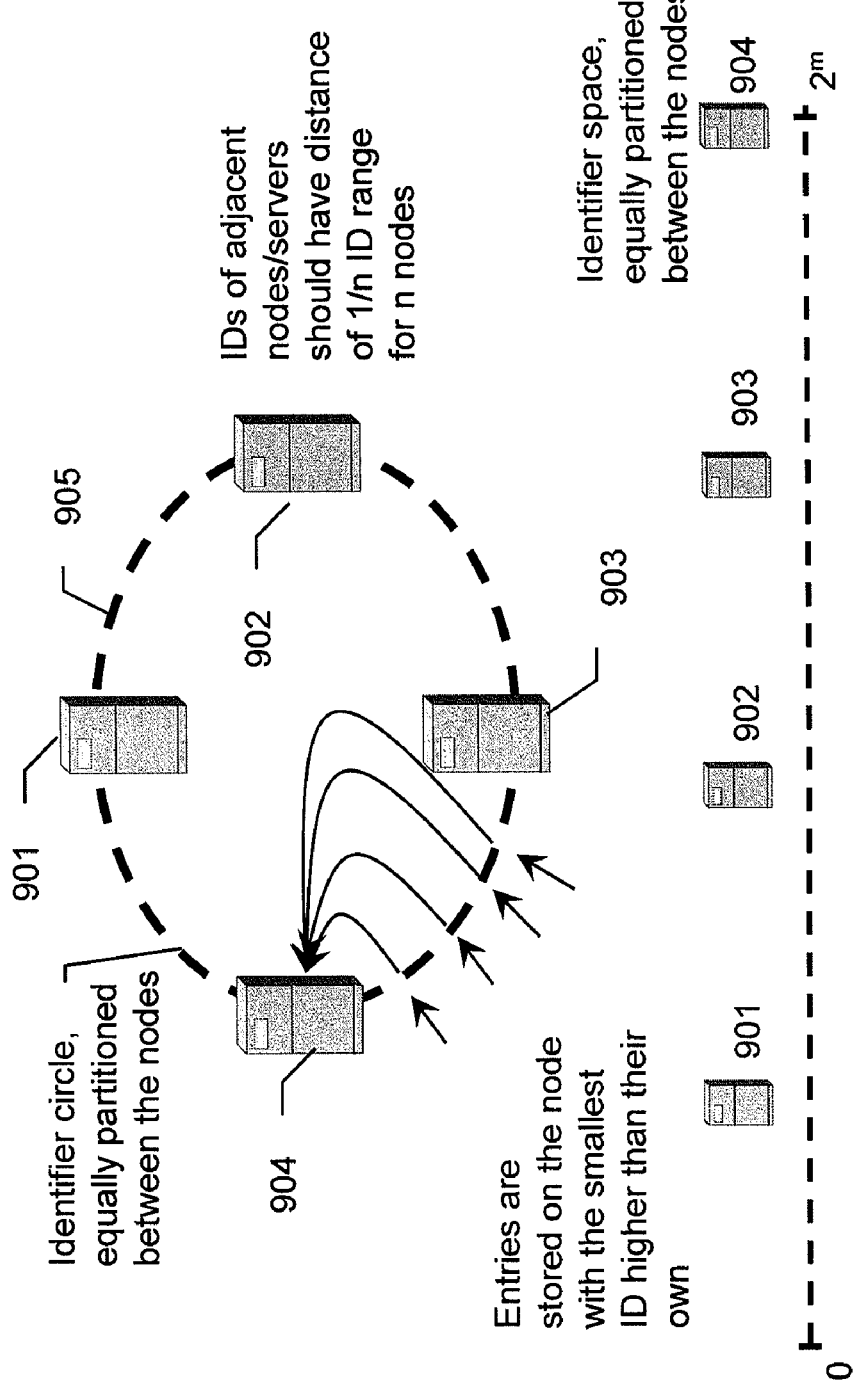
FIG. 5 shows a schematic diagram illustrating positioning of front-end devices in an identifier space according to an embodiment of the invention.

Nevertheless, another principle shown in the figure is the placement of documents (xml files in the example of the figure, lookup entries from the second table in our invention) on the servers. In general, structured overlays such as DHTs gain their comparably good search performance from the fact that documents/data objects have one specific server/node that is responsible for them. This responsibility relationship can normally be easily derived from the hash values (IDs) of the objects and servers. As a consequence, if an object is searched for, just the server that should be responsible for it (if it exists) has to be located and queried. In the example of the figure, the rule for assigning servers to data objects is that an object is stored on the server with the lowest hash value (ID) higher than the hash value of the object. This is the same in the present invention (as also depicted in FIG. 5). For example, the document with hash value 23 (obj z) is stored on the server whose ID succeeds this hash value, in this case server x with hash value/ID 42. This is the main principle that should have been visualized by the figure.

There are different options regarding generation and assignment of Node IDs. One method is to "hash" an IP address of a device. The result will be a bit-string, e.g. 128 or 256 bit. Even if two IP (Internet Protocol) addresses are very similar (e.g. 10.10.10.1 and 10.10.10.2), the hash output is totally different and distributed over a large distance in the hash space which comprises all possible numbers.

In order to introduce load balancing into the system, each device should store approximately the same amount of lookup data, or the amount of lookup data is balanced in accordance with device conditions. This ensures that memory consumption on each node is equal, allowing for less memory to be installed on all nodes, and that the same amount of queries has to be resolved by each node. To achieve this, the front-end devices are placed equidistant on an identifier ring. Such an overlay is shown in FIG. 5. Front-end devices 901-904 are placed on an identifier circle 905 which is equally partitioned between the devices 901-904. Lookup table entries are stored on the device with the smallest ID higher than their own IDs. IDs of adjacent devices should have a distance of 1/n ID range for n devices. With the equally partitioned identifier circle 905, the identifier space is equally partitioned between the devices 901-904 as shown in FIG. 5.

However, since the system should be transparent to an external application querying the database, each front-end server device must be able to receive queries for any of the data sets in the back-end system, and accordingly has to be able to resolve these queries. Since one front-end device does not hold the complete lookup data, an internal routing mechanism is introduced in order to reach the remote device where the lookup entry for a given query is located. This routing mechanism is not part of the description of the present invention.

According to the addressing scheme described above, each front-end device stores a small first lookup table as a routing table, comprising all front-end devices in the system, with their overlay IDs as addresses. For a given database query, a front-end device can decide which other front-end device is responsible for the corresponding lookup entry by hashing the database search key and retrieving the front-end device with the lowest ID higher than the hashed key.

The load balance introduced by the equidistant spacing of the front-end device addresses in the identifier ring as shown in FIG. 5 is destroyed if one or several front-end devices fail. In this case, the system starts a reorganization process as described in the following in order to achieve an equal load distribution with the remaining nodes as shown in FIG. 2, As described above, assuming a large number of documents, these are distributed substantially equally in the identifier space. This means that the server IDs, i.e. their 'position' in the identifier space, and those of their predecessor and successor directly influence the amount of data one server has to store. Therefore, in order to guarantee load distribution for smaller systems, the servers are not placed randomly in the identifier space but equidistantly, e.g. by hashing.

However, due to server failures or the addition of new servers, this fair partitioning of the identifier space is initially destroyed, resulting in load inequality. In order to re-establish a state with equal load distribution despite of a changed number of servers, their positions in the identifier space and with it the data that they are responsible for have to be adapted. In the following, embodiments of the invention will be described which achieve this task.

In order to start the reorganization mechanism for a distributed query routing system according to the present invention and enable new nodes to become part of the system, and for a ring master to create an initial set of nodes which a first ring state will consist of, some kind of bootstrapping procedure is required.

For example, and initial node table is created manually, once, and from then on, the system works automatically. In addition, an IP broadcast mechanism may be used to send an IP packet to all local nodes, and let them answer accordingly so the ring master knows availability of the other nodes. Instead of broadcasting, a dedicated, known small range of IP addresses may be used for the system. This range can be checked by sending individual packets to each address.

New nodes have to know at least one of the other node's IP address. This may be manually configured, or, IP broadcast is again used to find out about the other nodes.

With regard to the detection of a changed state, there are two different cases of ring states:

1) Normal state: the ring master has initially distributed a starting state, and there are no changes. The ring master does not do anything during this state.

2) Changed state: Whenever a node detects that it cannot reach another node any more, it signals the failure to the ring master only. Two sub-cases are important:

2a) The ring master itself does not work any more: In this case, a new ring master is selected, e.g. the front-end node with the lowest ID. Then 2b) follows.

2b) The ring master is still alive. It calculates a new state and sends the corresponding table of responsibility for content ID intervals to all nodes of the system. After this, the system is in the normal state again.

As described above, reorganization takes place if a change in the network state is noticed by any one of the active servers in the system. This change may either be one or several new servers entering the system, or one or more server failures, or both. With respect to load balancing, server failures are the more critical case, since here the load balance in the overlay created by the identifier space is destroyed and some of the still active servers are utilized much higher than the rest. In contrast, a server join does not directly endanger the functionality of the lookup system. In the following, a general case of a network state change will be described and only the cases when a different treatment is actually needed will be discerned.

Figure 6:
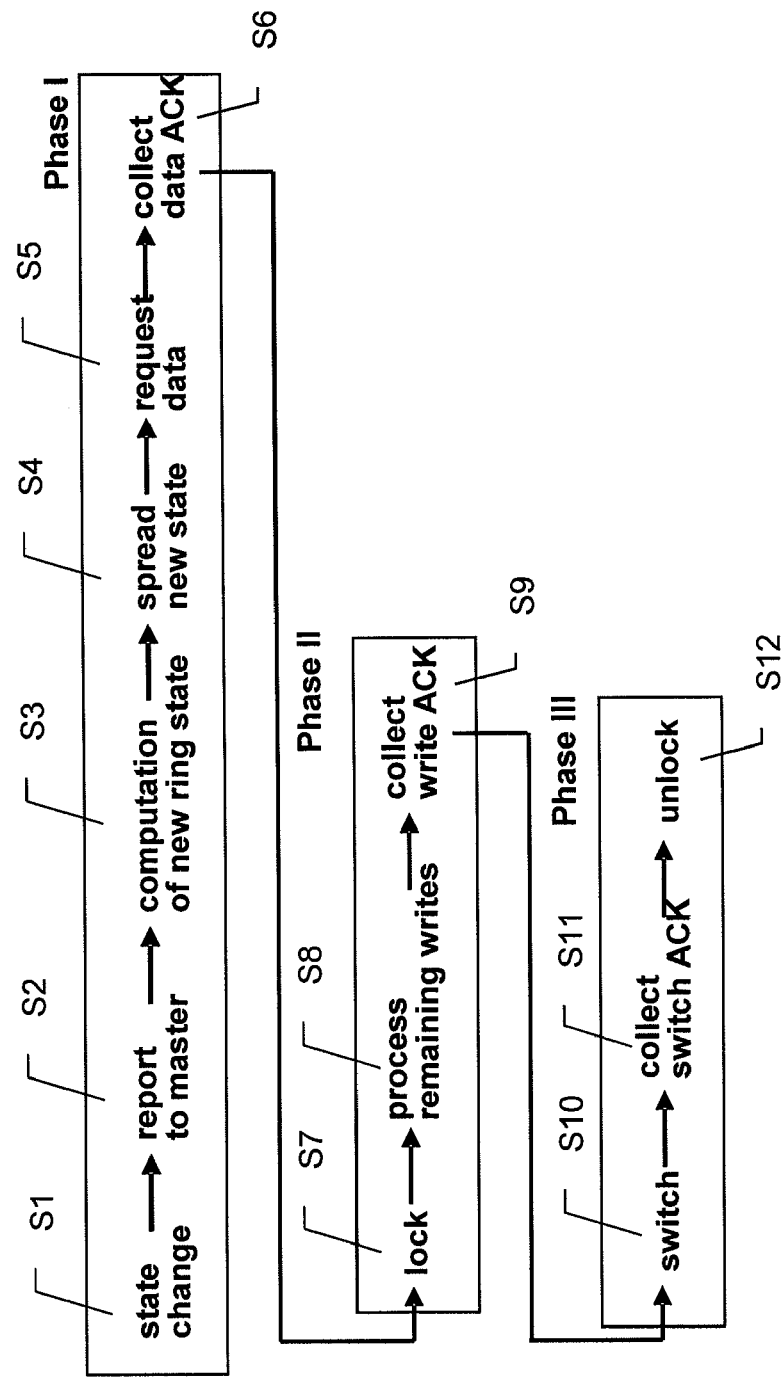
FIG. 6 shows a schematic diagram illustrating re-organization phases according to an embodiment of the invention.

According to an embodiment of the invention, the complete reorganization procedure is partitioned into three basic phases as shown in FIG. 6, that are conducted in every case of a state change. Phase I covers processes from a network state change to a re-distribution of data stored on each server of the network. Phase II makes sure that all write actions are completed, while Phase III sees to the switchover of all servers to a new and stable network state.

Figure 7:
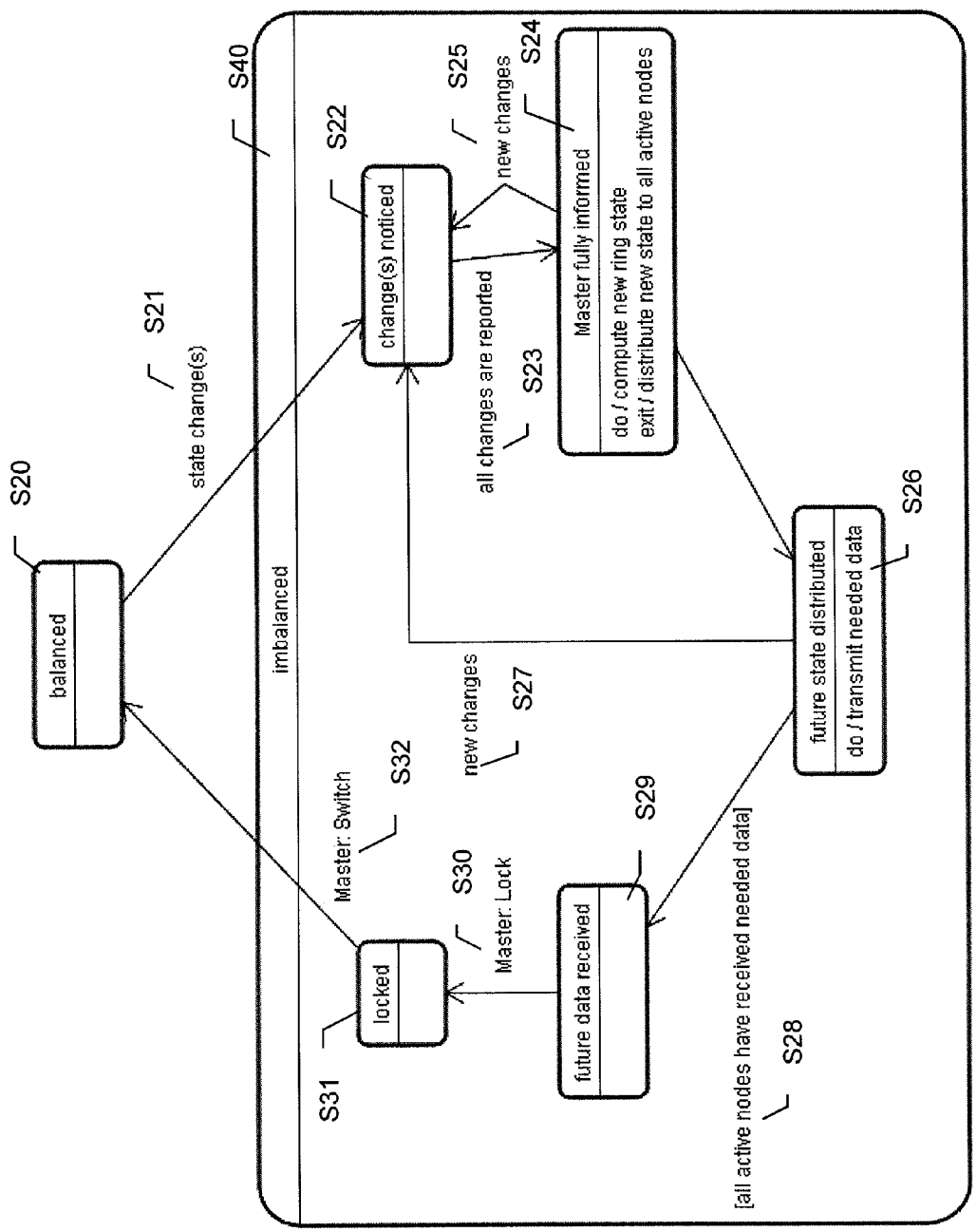
FIG. 7 shows a state diagram illustrating states and transitions between the states of a ring in the re-organization phases of FIG. 6.
Figure 8:
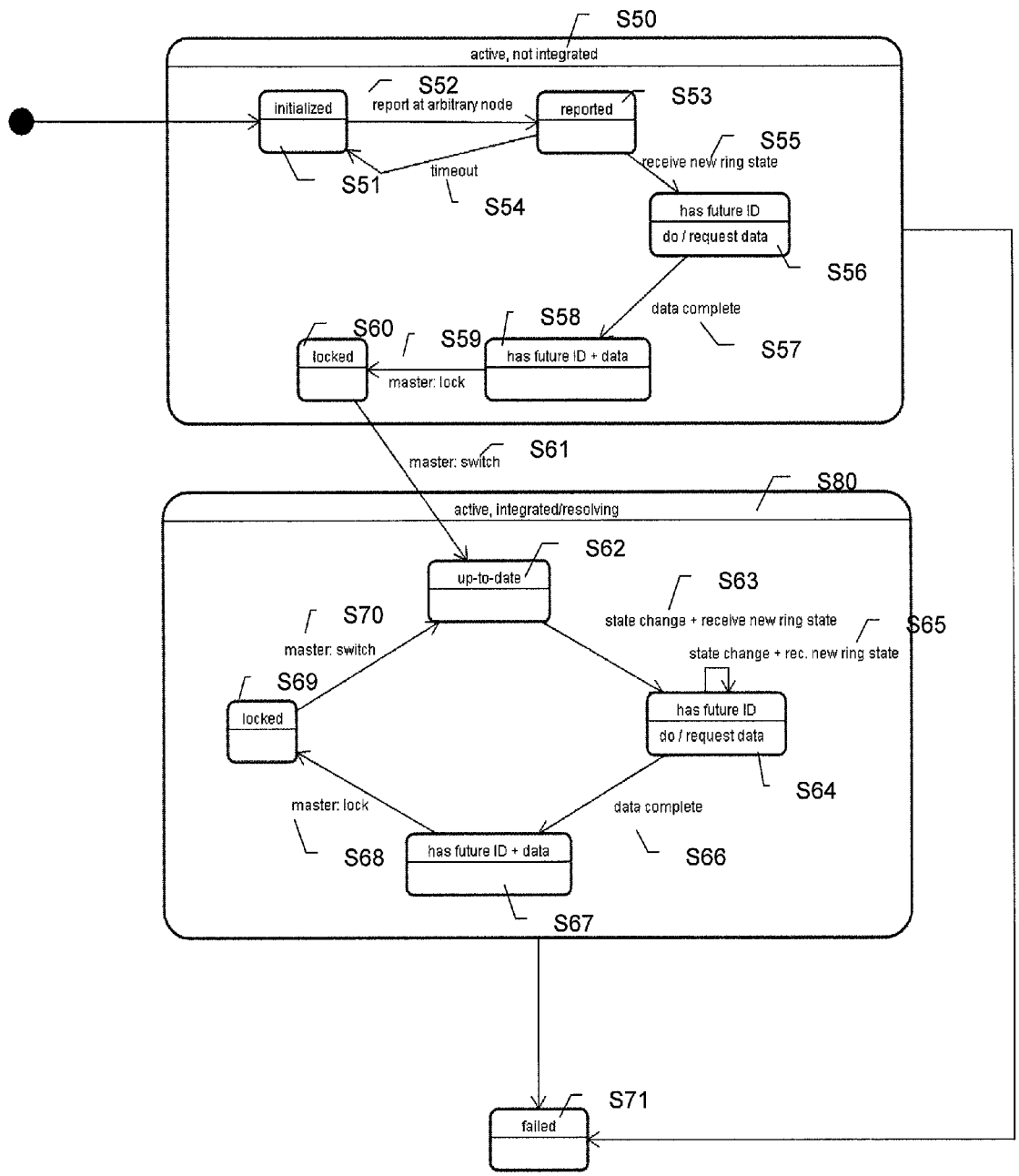
FIG. 8 shows a state diagram illustrating states and transitions between the states of a server in the re-organization phases of FIG. 6.

The phases described below result in different server and ring states that are possible during reorganization. FIG. 7 illustrates a ring state diagram, and FIG. 8 illustrates a server state diagram.

Phase I: Data Shift in the Overlay

The first phase begins with one or several active servers in the overlay noticing that the network state has changed (S1). As shown in FIG. 7, the ring state changes from a state "balanced" S20 to a state "change(s) noticed" S22 which is part of a ring state "imbalanced" S40 upon an event "state change(s)" S21.

In the case of server joins (i.e. new servers), this is accomplished by a notice from the new server(s) to any of the active servers. New servers are considered active, i.e., working, but not integrated into the network as long as they have not completed the whole reorganization procedure. Up to that point, they are also not participating in the resolving process for data queries.

As shown in FIG. 8, a server in a state "active, not integrated" S50 changes from a state "initialized" S51 to a state "reported" S53 by reporting S52 at an arbitrary node of the network. In case of timeout of the server, it changes again from S53 to S51. The server changes from S53 to a state "has future ID" S56 by receiving S55 a new ring state. The server then requests data and changes from S56 to a state "has future ID+data" S58 when the requested data is complete S57. When the server receives a lock command S59 from the ring master to be described in Phase II it changes to a state "locked" S60. After receiving a switch command S61 from the master to be described in Phase III, the server changes to a state "up-to-date" S62 in a state "active, integrated/resolving" S80. In this state, when a state change occurs and a new ring state is received S63 the server enters a state "has future ID" S64. In state S64, the server re-enters state S64 if a state change occurs again and again a new ring state is received S65. The server requests data and if requested data is complete S66 the server enters a state "has future ID+data" S67. When the server receives a lock command S68 from the ring master to be described in Phase II it enters a state "locked" S69. In this state, when the server receives a switch command S70 from the ring master to be described in Phase III it again enters state S62.

Server failures are detected by timeouts from the normal query traffic in the network or by a loss of connection. Other mechanisms such as additional keep-alive messages are possible, but not deemed necessary.

Each server of the network or ring noticing such a change reports this change to the ring master (S2), which is defined as the active server with the lowest ID in the whole overlay ring. Each report contains the kind of change (join/leave), the IP address of the server that has changed, and its overlay ID. The observed change is also stored on the server observing the change. Every time another change is seen by this server, it will report its complete set of observations (old and new). This makes sure that if the master server or ring master itself fails before the last observation is reported, a new ring master gets the complete information about the network state. Otherwise, the observations sent to the old ring master would be lost. Redundant reports, either from the same or from different servers, can be correlated by the ring master.

Other than reporting and storing the state change, a normal server takes no further action. It continues with its normal lookup and forwarding operations until it receives other orders from the master server.

As shown in FIG. 7, the ring state changes from state S22 to a state "master fully informed" S24 in case all changes are reported S23 to the ring master. In case new changes are noticed S25 the ring state switches back to state S22. When the ring master is fully informed it computes a new ring state and distributes the new ring state to all active nodes.

The master server (i.e. the ring master) starts a local timer when it receives the first change report and resets this timer each time it receives a new change notice. This timer is called reorganization hysteresis timer (RHT). Once the RHT reaches a pre-set value which may be set by an operator, the ring master starts to compute a new ring state based on the information about still active servers (S3). The RHT ensures that a number of changes in a small timeframe are considered as a whole in this computation. Otherwise, each new change notice would trigger a new computation and the subsequent messages. In addition, the RHT can be used to prevent a reorganization process if a server has only very short-term problems (e.g., load spikes) and produces only a few timeouts. However, it is assumed here that a server that has lost connection to the network has failed permanently. As shown in FIG. 8, when the server fails it enters a state "failed" S71 either from state S50 or state S80.

Changes that occur after the RHT has finished its countdown will be described later on.

The computation procedure of the new ring state will be described in detail below. It returns a mapping, assigning each server a new overlay ID. This is the ID a server will have after the reorganization. This full mapping is then broadcasted (S4) to every server taking part in the reorganization, i.e. every server which is known to the ring master as being in active state S50 or S80. The reception of this mapping has to be acknowledged by each server, since the reception of this message containing the future ring state triggers the next step for every server in the overlay. Up to this point, each server except the ring master has only reported observed network changes, but has otherwise just conducted its regular forwarding and lookup operations.

The information received with that message allows each server to compute the primary as well as the total range of data sets it will cover in the future ring. The primary range is the range from its new predecessor to its own new ID, while the total range is larger by the redundancy factor specified.

Based on this, each server can determine which data contained in this total range according to the new system state is missing in its second lookup table and which data the server already has. As shown in FIG. 8, in state S64 the server requests the missing data (S5 in FIG. 6). This missing data is in general also a set of (smaller) ranges, which in turn can be associated with the responsible servers where this data currently is stored (provided that no data loss has occurred). Therefore, each server can request this data from these (previously) responsible servers, specifying the ID ranges it needs to be transmitted. Namely, based on the first lookup table that contains also mapping information between the first lookup table after and before the detected state change, each server is informed from which servers it can get data for its (new) second lookup table after the state change.

The step in which after a state change the calculated and "updated" first lookup table data (including by the mapping information) is transmitted/copied to the servers will be the most time-consuming during the whole reorganization phase. The time needed for transmitting this data depends on several factors, including the network speed, the number and position of the servers that have failed, the total amount of data that is stored in the ring, and the current system load in terms of external search requests.

In order to have a reference point, in the worst case several GB of data have to be transmitted over a 100 MBit/s LAN (Local Area Network), resulting in a raw total transmission time in the range of several minutes. Moreover, since this transmission process is prioritized low in comparison to the normal lookup traffic, it can be slowed by both scarce processing resources at the servers as well as small available bandwidth in the network, possibly extending this phase to the span of hours.

Another important point is that the amount of memory (RAM or hard disk) on each server has to be dimensioned such that the additional data stored during that time can be held. A first rough estimate for the worst case would place the memory consumption at twice the amount needed for normal operation. This is still significantly less compared to a fully redundant system where each server holds the entire data space.

When a server has received all data it has requested from other servers (S66 in FIG. 8), it will report this fact to the ring master. The ring master monitors the progress of the operation by monitoring the number of servers that have finished receiving data (S6). When all servers have communicated their readiness, the ring master triggers Phase II of the reorganization.

As shown in FIG. 7, in state S24 the ring master computes the new ring state and the new state is distributed to all active nodes. After that, the ring enters a state "future state distributed" S26, in which needed data is transmitted. If all active nodes have received the needed data (S28), the ring enters a state "future data received" S29.

Phase II: Locking Writes for Data Consistency

The underlying premise in this and the following phase III is that each server has all data it needs to make the state switch, as well as its old data, due to the successful finish of Phase I. In Phase II, the problem of write operations in the system is covered. A write operation here means a creation, deletion or update of data sets stored in the system. In the following, some basic mechanisms to handle these operations are described in order to show the feasibility of the described approach. However, since the requirements of data integrity and synchronization strongly depend on the application for which the data is stored, only general remarks are given.

During normal operation, writes have to be propagated not only to one server, but also to the redundant storage locations. This includes some mechanism of locking read access to these data sets during a write operation.

During reorganization, the number of servers where a data set is stored increases by the number of servers that have requested this data set in order to cover their future ranges. This means that write operations in this phase have also to be propagated to the future storage locations of this data sets, which can be computed from the future ring state that each server has received.

The remaining problem is that possibly this forwarding of write requests forms a never ending chain prohibiting a state change. If a write request has reached the primary (old) server for a data set to be changed, a ring state switch cannot be conducted because the new storage locations of this data set do not have the correct information/state. However, in the time it takes to forward this change, new write operations can enter the system.

To avoid this, and to reach a state where the data stored in the ring is stable, Phase II of the reorganization introduces a write-lock state, where no new write operations are permitted to enter the system.

The first step to achieve this is to broadcast a write-lock message to all servers (S7 in FIG. 6; S30 in FIG. 7; S59, S68 in FIG. 8), informing them that they should not accept any more write operations from external systems. This message has to be acknowledged by all servers, ensuring that at some point in time, no new write operations enter the system. During and after this step, write operations already accepted are still forwarded normally to all concerned servers (S8). Normal read operations are not affected by this.

Each server monitors how many write operations it still has to forward to other servers. Once it has processed all of these forwards, it reports this fact to the master, which again waits until each server has signalled its readiness (S9). After all reads are processed, it signals the transition to Phase III by broadcasting the switch message (S10 in FIG. 6; S32 in FIG. 7; S61, S70 in FIG. 8). As shown in FIG. 7, after the lock command has been issued by the ring master, the ring enters a state "locked" S31, i.e. each server in the ring, having received the lock command, enters the state "locked" S60 or S69 as shown in FIG. 8.

It is important to note that while in Phase I, the recipients of data are responsible for declaring their part of the operation complete (having received all requested data), in Phase II the sources must take over this responsibility. This is necessary because each server knows which write operations are still queued, but not how many of these operations it will receive.

Phase III: Switching to New System State

Entering this phase means that all servers have stored the data needed for their new state and that this data is up-to-date, i.e., no write operations are pending for the data sets. The first step in this phase is the broadcast of the switch command by the ring master (S10 in FIG. 6; S32 in FIG. 7; S61, S70 in FIG. 8), which again has to be acknowledged by all servers. These switch acknowledgments are collected by the ring master in S11. On receipt of the switch command each server activates as its first and second lookup tables the new tables generated from the information gained by the new ring state message received from the master server in Phase I. At this time, also the master server itself activates its new (calculated and generated) first and second lookup tables.

From that point in time onwards, a server forwards messages according to this new routing table. As shown in FIG. 7, after "replacement" of the active routing table by the new lookup table upon the switch command from the ring master, the ring enters in the balanced state S20 again, i.e. each server (re-)enters the up-to-date state S62 in FIG. 8.

Because it is impossible that all servers switch state at the same time which may be due to time differences in the broadcast message transmission, processor scheduling in the servers and the theoretical non-existence of concurrency, there will exist (albeit only for a short time) a state in which some servers in the ring route according to the old ring state/routing tables, and the rest according to the new state. Later on this transition state will be described.

Once all servers have committed themselves to the new state and have reported this to the (old) ring master, this server, which is not necessarily the master in the new ring, but still has the responsibility to finish the reorganization, can issue an unlock broadcast message (S12), so that writes are allowed again. The ring has now completely switched to the new state, the old stored data and routing tables can now be discarded.

Computation of New Ring State

The procedure to compute a new ring layout after a state change is carried out on the master server (i.e. the ring master). The old ring state and the changes are input to the procedure. In case of server failures, these have already been included in the current ring state, since failed servers have to be excluded from the forwarding process immediately after discovery of the failure in order to prevent lost queries. A mapping between each active server and its new ID in the future ring state is output from the procedure.

In principle, the new ring state computation procedure is a modular part of the reorganization procedure. In the following an embodiment of the new ring state computation procedure will be described. It is to be noted that the computation of the new ring state is not limited to the embodiment to be described in the following.

The new ring state computation procedure serves to close gaps created in the overlay ring by server failures and to insert new servers into the ring so that in the resulting ring, the servers are again distributed evenly in the overlay or are distributed according to their conditions, resulting in load distribution. However, it also tries to move each active server only a small distance from its current position, since a different position in the overlay means different primary and total ranges for that server and therefore missing data that has to be transmitted. The larger the difference between old and new ranges is, the more data has to be transmitted, resulting in a) a longer reorganization time span and b) more load on the servers and the network. The exception are new servers joining the network, they have to request a full total range in any case, provided that they cannot be initialized with an external copy of the lookup database, which would have to be up-to-date.

Figure 9:
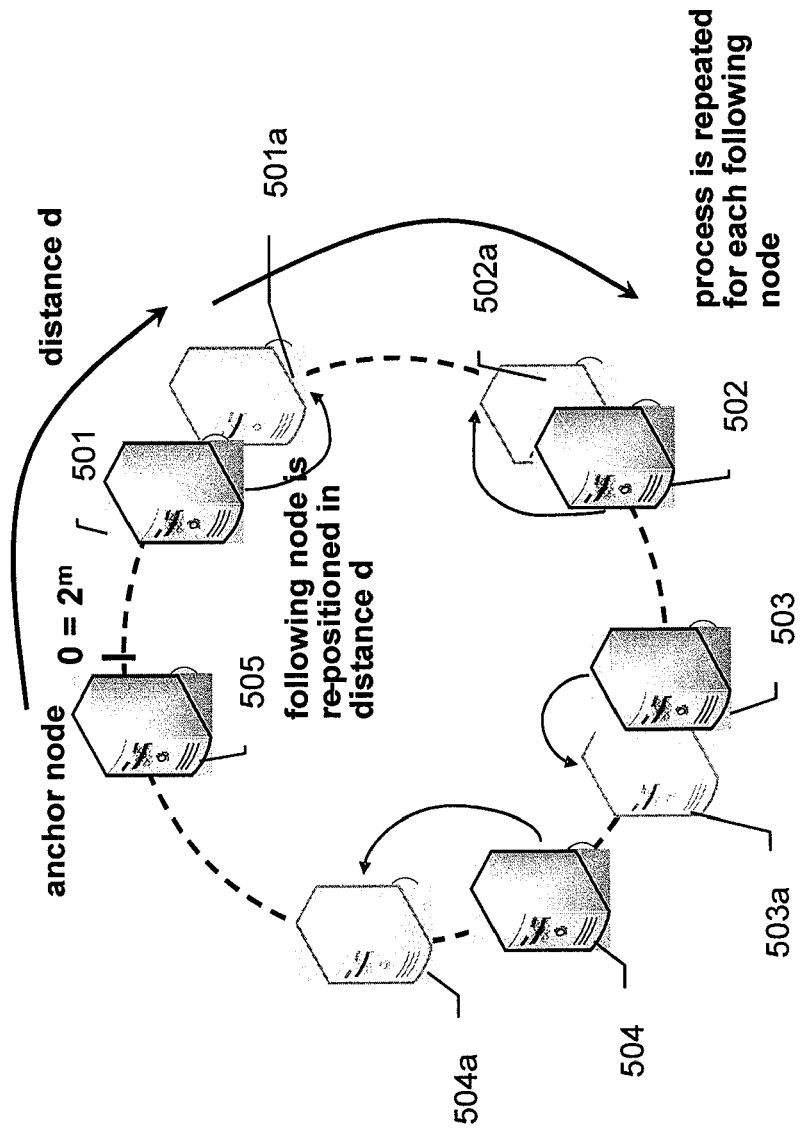
FIG. 9 shows a schematic diagram illustrating a server repositioning procedure according to an embodiment of the invention.

FIG. 9 shows an overlay ring in which servers 501, 502, 503, 504 and 505 are located in an identifier space 0 to $2^m$, wherein m is the number of active servers in the ring. First, a distance d is computed that each server must have from its predecessor and successor in a ring state where the servers are distributed as evenly as possible. This is the size of the ID space divided by the number of active servers, the active servers comprising old, "surviving" servers plus newly joined servers.

Then, an anchor server 505 is chosen as a basis for the repositioning of the other servers 501-504. Every server 501-505 can fulfill that role. In the present case the predecessor of master server or ring master 501 is selected as basis. Starting from the anchor server 505, its successor 501, i.e., the still active server with the lowest ID larger than the ID of the anchor server 505, is repositioned so that the distance in the overlay/ID-space is equal to d. Distance d is derived by dividing the size of the ID space by the number of active servers. The server 501 which has been repositioned to position 501a now functions as new base server, and its successor 502 is repositioned to position 502a, i.e. at a distance d from position 501a. This process is repeated for each following server 503 and 504, which are repositioned to positions 503a and 504a, respectively, so that the servers 501-505 again are evenly distributed in the ID space.

As described above, the repositioning process is repeated until every server (including the anchor server as a final step) has been repositioned. Joined servers are evenly dispersed in this scheme, so that for O old and N new servers, $$\left[\frac{O}{N}\right]$$

old servers are placed in the new ring before one new server is inserted. In case more servers join the network than are already active, the remaining new servers are inserted at the end of the ID-space in a row.

The procedure of calculating a new ring state is given as pseudo-code in the following:

```
newRing computeNewRing(currentRing, newServers)
distance = round(IDSpace.size/(currentRing.size + newServers.size));
if (no new servers)
    spacing = currentRing.size;
    insertNewServerCounter = spacing+1;
else
    spacing = round(currentRing.size/newServers.size);
    insertNewServerCounter = spacing;
recalc = first server in currentRing;
anchor = predecessor(recalc);
for currentRing.size + newServers.size steps do
    put recalc in newRing in new position anchor.position + distance
    anchor = recalc;
```

-continued

```
    if (insertNewServerCounter = = spacing)
        recalc = new server not yet inserted;
        insertNewServerCounter = 0;
    else
        if (insertNewServerCounter != 0)
            recalc = successor(recalc);
        else //a new server has just been inserted
            recalc = successor(predecessor(recalc) in currentRing);
        insertNewServerCounter++;
    if (recalc = = first Server in currentRing)
        break;
```

//in case more new servers have joined than were already active insert last new servers one after another into newRing, spaced by distance State Changes During Reorganization Although unlikely, it is possible that additional state changes happen during the reorganization phase, while consecutive failures/joins have been covered by the reorganization timer at the ring master. Depending on the reorganization phase, these changes are handled in different ways:

If a state change happens during Phase I, the complete reorganization process is re-started, taking the new information into account. The new change is reported to the ring master, which starts a new computation of the future ring state and broadcasts this new ring state to all other servers again. The new receipt of such a message by an ordinary server triggers a new computation of this server's new ranges, a "deletion" or at least deactivation of previously received new data that is no longer needed, and the request of the now missing data sets. All current data transmissions that are no longer of interest are cancelled. The reason for this policy is the fact that it is difficult to estimate the time the rest of the reorganization would take, and therefore how long the load instability created by an additional server failure would have to be endured by the network.

After reaching Phase II, however, the last steps of the procedure are completed in a short time. Therefore, a state change in Phase II or III is recorded by the observing server, but the old reorganization process is finished first before this new development is the starting point for a new reorganization. This is to minimize the loss by throwing away already completely transmitted data.

State Switch

As stated above, during Phase III the ring will be in a mixed state, where some of the servers have already switched to the new state, while the rest is still waiting for the switch command. This means that queries may be forwarded to servers that are in a state different from that of the forwarding server.

Two cases are distinguished here: a forwarded query from a server in the old state to one in the new state, and vice versa. FIG. 10 shows routing from a server in the old state to a server in the new state, and FIG. 11 shows routing from a server in the new state to a server in the old state.

In the first case, as shown in FIG. 10, the server (node A) in the old state assumes that the servers in its routing table are also in the old state and therefore are responsible for the ranges indicated by that routing table. Thus, for a given search key x, it forwards the query to a server (node B) that is responsible for x according to the old routing table of node A. However, if node B has already switched to the new state, its primary (or even total) range may not contain that entry. However, since the switch is not completed for the whole ring, node B still has its old data additionally to its new primary and total range. This old range must contain the entry for x, because in the old state, node B was responsible for the range indicated in the old routing table of the sending server (node A). Otherwise, R consecutive servers have failed, and data loss has occurred, with R being the chosen redundancy factor.

This in turn means that the receiving server (Node B) can answer the internal query from its old data set which has not changed, since no writing operations are allowed in that phase.

In the second case, as shown in FIG. 11, a server (Node B) that has already switched state forwards a query according to its new routing table. If node A receiving the internal query has not switched its state yet, it can therefore receive a query for an entry that is not in its (old) primary or total range. However, since node A has already received the data it needs to switch to its new state, it also has the primary and total range indicated by its entry in the routing table of node B. It is therefore able to answer the query from the additional data sets it stores, which are also up-to-date, since all write operations have been forwarded and concluded in Phase II.

Master Failure

The special case of a master failure during reorganization needs particular consideration. In principle, it is possible if not probable that the master server (i.e. ring master) itself fails during any of the reorganization phases. In the following it will be described how the system reacts to such a master failure.

In any case, the failure of the ring master will be noticed by at least one other server, most likely by several and possibly even by all other servers due to the fully meshed structure of the network. If the master fails during any of the phases of the reorganization, the failure along with all previously reported changes are reported to a new master server with the now lowest ID in the routing table or a server reporting the changes. This report also includes the state of the server sending the changes (i.e., the step of the reorganization the server actually is in). The recipient of this report can infer from the mere fact that it was sent to it that it is the new master server. The information about the server states allows the new master server to compute a view on the total ring state, especially on which servers are one step behind in the reorganization process and which prerequisites have to be met until the next step can be taken.

In case some servers have not noticed the master failure, the new master server can still poll the other servers for their state and the state changes they have seen and inform them of its new status. Thus, no information held by the master server is lost should the master server fail. At no time the system is in a state where it cannot proceed in the reorganization because of the loss of the ring master.

The present invention is applicable to environments such as HLR, Radius, OAM DB, NM DB, charging DB, etc.

Figure 12:
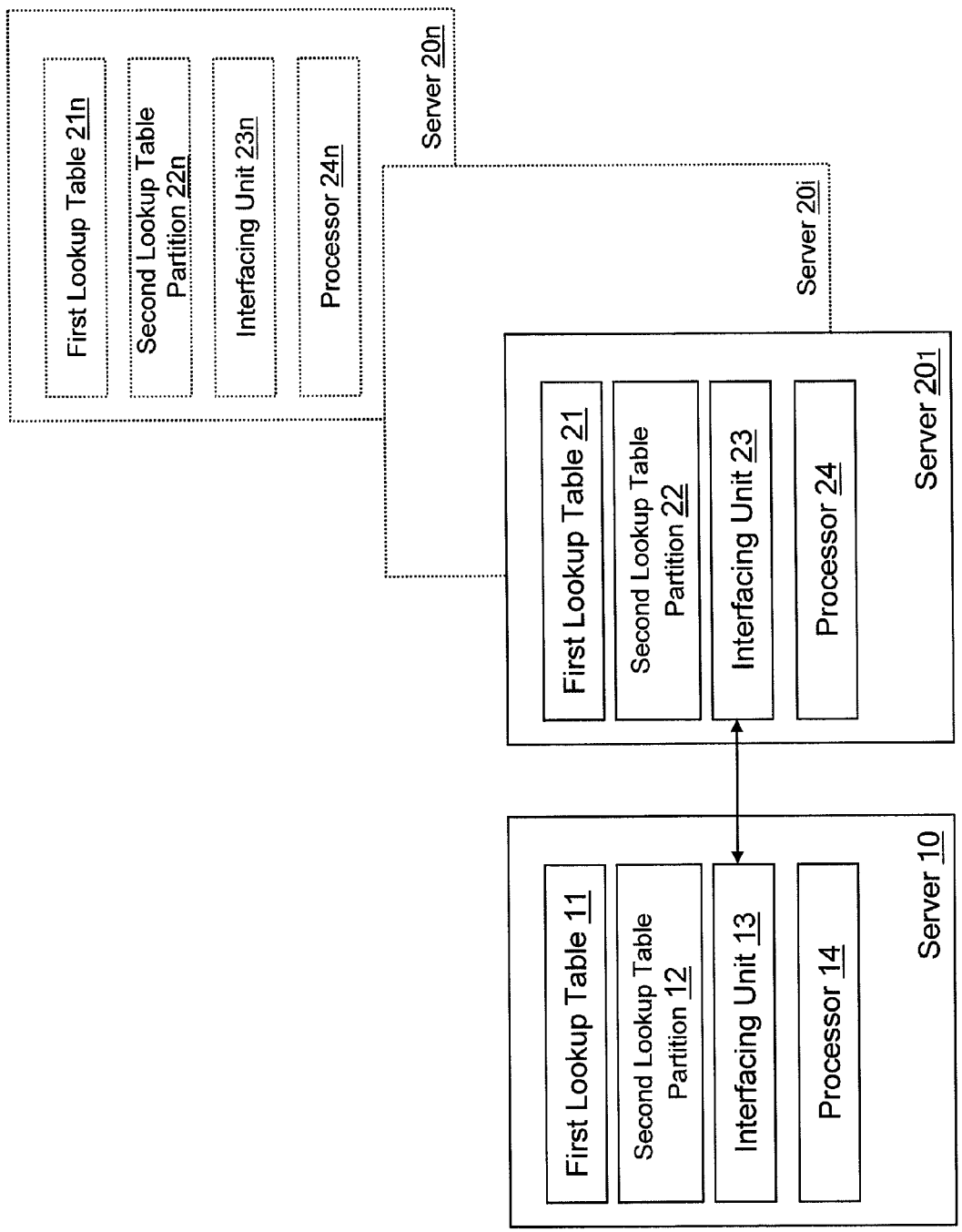
FIG. 12 shows a schematic block diagram illustrating servers according to an embodiment of the invention.

FIG. 12 shows a schematic block diagram illustrating servers $10, 20_1, \ldots 20i, \ldots 20n$ according to an embodiment of the invention. The servers $10, 20_1, \ldots 20i, \ldots 20n$ may be front-end devices of a distributed database system.

The servers $10, 20_1, \ldots 20i, \ldots 20n$ each comprise a first lookup table (partitioning table, first data structure) $11, 21, \ldots 21n$ indicating a distribution of a second lookup table (lookup table, second data structure), a partition of the second lookup table $12, 22, \ldots 22n$, an interfacing unit $13, 23, \ldots 23n$ which interfaces the servers $10, 20_1, \ldots 20i, \ldots 20n$ with each other, and a processor $14, 24, \ldots, 24n$.

Assuming that the server 10 is selected as master server, e.g. because its ID is the lowest one in the network as described above, the processor 14 determines a state change in a network comprising the server 10 as a master server among the plurality of servers $10, 20_1, \ldots 20i, \ldots 20n$.

The processor 14 calculates the first lookup table 11 which indicates respective partitions of the second lookup table distributed among active servers of the plurality of servers $10, 20_1, \ldots 20i, \ldots 20n$, and distributes the calculated first lookup table 11 to each active server via the interfacing unit 13. Based on the first lookup table 11, the processor 14 generates a modified partition of the second lookup table.

To calculate the first lookup table 11, the processor 14 may allocate partitions of the second lookup table to active servers, wherein respective partitions of the second lookup table allocated to each active server equal each other in terms of size, wherein the size is defined by a difference between a start address value and an end address value. Alternatively, the respective partitions differ from each other in terms of size in proportion to a respective processing capacity of each of the active servers, or in such a manner that a processing load for each of the active servers equals each other.

The processer 14 may further collect first acknowledgements, via the interfacing unit 13, from respective active servers indicating that generating modified partitions of the second lookup table at respective active servers is completed, issue a lock command to each active server in the network via the interfacing unit 13 upon collecting the first acknowledgements, and collect, via the interfacing unit 13, second acknowledgements from every active server indicating that it is locked, wherein writing operations are prohibited when a server is locked.

The processor 14 may further issue a switch command to each active server in the network via the interfacing unit 13 upon collecting the second acknowledgements, and collect, via the interfacing unit 13, third acknowledgements from each active server indicating that each the server switches to the first lookup table and the modified partition of the second look up table.

The processor 14 may further issue an unlock command to each active server in the network via the interfacing unit 13 upon collecting the third acknowledgements.

The state change in the network may pertain to at least one of the following:
  a change in a state of at least one server, comprising at least one of a change in an activity of the server, a change in a processing capacity of the server and a change in a processing load of the server;
  removal of a server from the plurality of servers constituting the network, and
  addition of a server to the plurality of servers constituting the network.

To determine a state change in the network, the processor 14 may start a timer (not shown) upon determination of the state change and check the state again upon expiry of the timer, wherein the processor 14 may confirm the state change if the state when the timer starts is the same as after expiry of the timer.

The first lookup table $11, 21, \ldots 21n$ may comprise at least a pair of data, wherein each pair of data comprises an address of an active server and an address partition representing a respective partition of the second lookup table and defined by a starting address value and an end address value, and may further comprise mapping information between the first lookup table after and before the detected state change.

The processor 14, to allocate partitions of the second lookup table to active servers, may re-divide an address space that is formed by the plurality of address partitions of the second lookup table managed by the respective active servers, among a number of the active servers after a detected state change, thereby obtaining a respective modified partition of the second lookup table for each active server.

The number of data pairs contained in the first lookup table may depend on the number of active servers.

The processor 14, to re-divide the address space, may shift at least one of the start address value and the end address value of the partition of at least one active server by a respective address shift amount.

The processor 14 may further validate the address shift amount after re-dividing. This validation may be performed after the unlock command has been issued.

The processor 14 may generate the modified partition of the second lookup table based on the calculated first lookup table, and based on at least one partition of the second lookup table respectively allocated to at least one server among the plurality of servers prior to a detected state change in the network. The processor 14 may exchange data with the at least one other server in order to derive data necessary to generate its modified partition. In case of a server failure, to be able to recover data from the failed server, redundancy is introduced such that data from the failed server is available from at least one other server.

Assuming that the server $20_1$ is one of the active servers as described above, the interfacing unit 23 receives the first lookup table 21 which corresponds to the first lookup table 11 calculated by the server 10 acting as the master server, and the processor 24 generates a modified partition of the second lookup table based on the first lookup table 21.

The processor 24 may cause the interfacing unit 23 to send a first acknowledgement to the master server upon completion of generating the modified partition of the second lookup table.

The interfacing unit 23 may receive a lock command, and upon receiving the lock command, the processor 24 may lock the active server $20_1$ and complete on-going writing operations, and upon completion of the on-going writing operations, cause the interfacing unit 23 to send a second acknowledgement indicating that the active server $20_1$ is locked to the master server, wherein writing operations are prohibited when the active server $20_1$ is locked.

The interfacing unit 23 may receive a switch command, and upon receipt of the switch command, the processor 24 may switch to the received first lookup table 21 and the generated modified partition of the second lookup table 22, and upon completion of the switching, cause the interfacing unit 23 to send a third acknowledgement to the master server.

Similar to the processor 14, the processor 24 may generate the modified partition of the second lookup table based on the received first lookup table, and based on at least one partition of the second lookup table respectively allocated to at least one server among the plurality of servers prior to a state change as described in the following by referring to FIG. 13.

Figure 13:
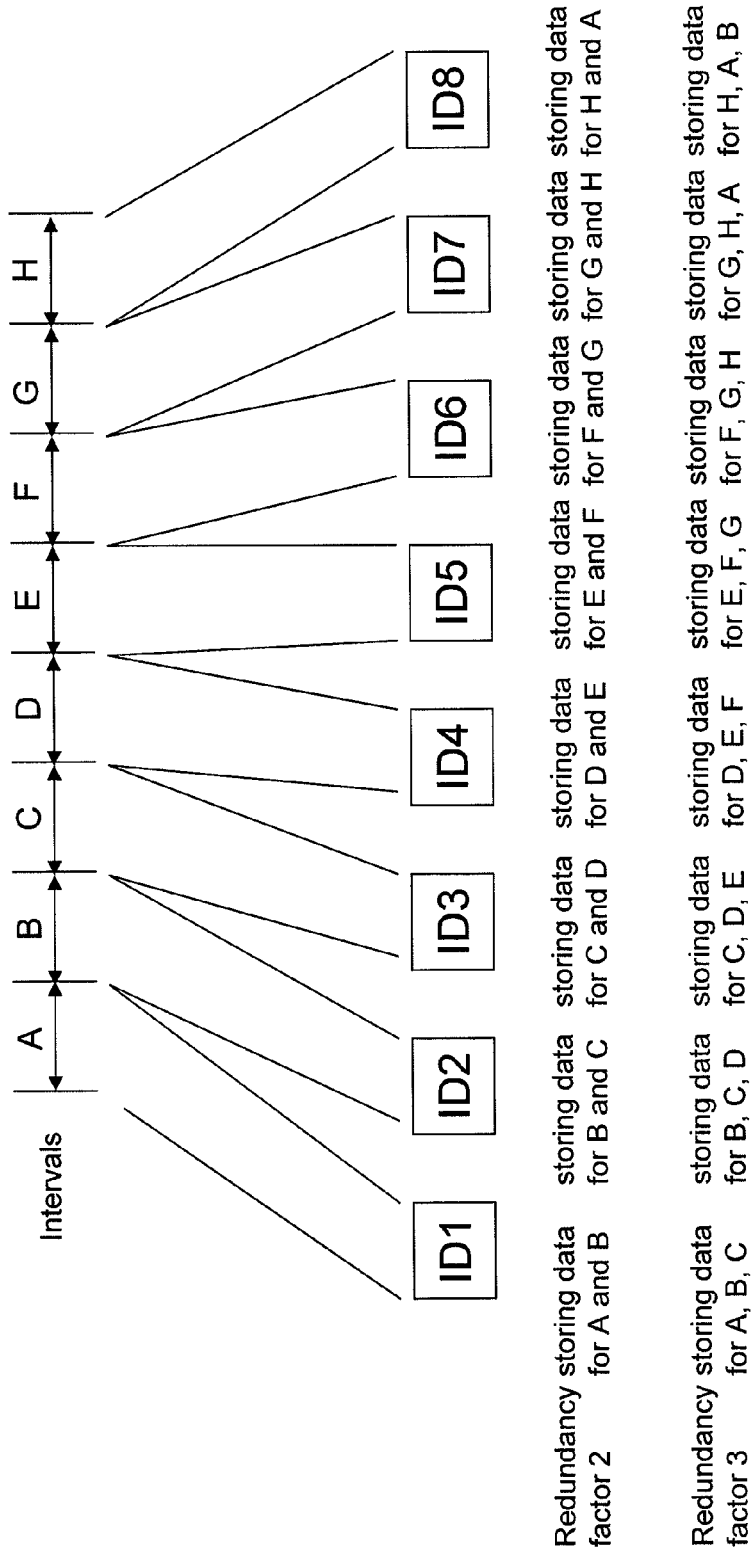
FIG. 13 shows a schematic diagram illustrating an example of a relationship between partitions of a second lookup table and servers when the partitions of the second lookup table are stored with a redundancy factor 2 or 3, according to an embodiment of the invention.

FIG. 13 shows a schematic diagram illustrating an example of a relationship between partitions of a second lookup table and servers when the partitions of the second lookup table are stored with a redundancy factor 2 or 3, according to an embodiment of the invention.

In FIG. 13 it is assumed that the complete data stored in the second lookup table has a size A+B+C+D+E+F+G+H, and that a lookup system consists of 8 servers. If these servers could not fail, it would be sufficient to store lookup data A on server ID1, lookup data B on server ID2, lookup data C on server ID3, lookup data D on server ID4, lookup data E on server ID5, lookup data F on server ID6, lookup data G on server ID7, and lookup data H on server ID8.

However, assuming that servers fail, redundancy is added by storing data in each server for which it is not primarily responsible. Considering a redundancy factor of 2 as shown in FIG. 13, the server ID1 stores its own data A as well as data another server ID2 is responsible for, i.e. data B. This applies also to the servers ID2 to ID8, respectively storing their own data as well as data the successor is responsible for (assuming a ring, ID1 is the successor of ID8).

Thus, if server ID2 fails, its data can be recovered from server ID1. If the redundancy factor is 3 as shown in FIG. 13, each server ID1 to ID8 stores its own data and the data two following servers are responsible for. That is, data of the second lookup table which is required for generating the modified partition as described above can be retrieved from a still active server that stores this data redundantly.

For the purpose of the present invention as described above, it should be noted that method steps likely to be implemented as software code portions and being run using a processor at one of the server entities are software code independent and can be specified using any known or future developed programming language;

method steps and/or devices likely to be implemented as hardware components at one of the server entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method comprising:
   determining a state change in a network comprising a master server among a plurality of servers;
   calculating, at the master server, a first lookup table, said first lookup table indicating respective partitions of a second lookup table distributed among active servers of said plurality of servers;
   distributing the calculated first lookup table to each active server; and
   based on the first lookup table, generating, at the master server, a modified partition of the second lookup table.

2. The method of claim 1, wherein
   calculating the first lookup table comprises:
   allocating partitions of the second lookup table to active servers, wherein
      respective partitions of the second lookup table allocated to each active server equal each other in terms of size, wherein the size is defined by a difference between a start address value and an end address value, or differ from each other in terms of size
   in proportion to a respective processing capacity of each of said active servers, or
   in such a manner that a processing load for each of the active servers equals each other.

3. The method according to claim 2,
   wherein the first lookup table comprises at least a pair of data, wherein each pair of data comprises
   an address of an active server and
   an address partition representing a partition of the second lookup table and defined by a start address value and an end address value, and further comprises mapping information between the first lookup table after and before the detected state change.

4. The method according to claim 3, wherein the number of data pairs contained in the first lookup table depends on the number of active servers.

5. The method according to claim 2, wherein the allocating comprises
   re-dividing an address space that is formed by a plurality of address partitions of the second lookup table managed by the respective active servers, among a number of the active servers after a detected state change, thereby obtaining a respective modified partition of the second lookup table for each active server.

6. The method according to claim 5, wherein the re-dividing comprises
shifting at least one of the start address value and the end address value of the partition of at least one active server by a respective address shift amount.

7. The method according to claim 6, further comprising validating the address shift amount after re-dividing.

8. The method of claim 1, further comprising:
collecting first acknowledgements at the master server from each active server indicating that generating modified partitions of the second lookup table at each active server is completed,
issuing a lock command to each active server in the network upon collecting the first acknowledgements; and
collecting second acknowledgements from each active server indicating that it is locked, wherein writing operations are prohibited when a server is locked.

9. The method of claim 8, further comprising:
issuing a switch command to each active server in the network upon collecting the second acknowledgements, and
collecting third acknowledgements from each active server indicating that each said server switches to its respective first lookup table and the respective modified partition of the second look up table.

10. The method of claim 9, further comprising:
issuing an unlock command to each active server in the network upon collecting the third acknowledgements.

11. The method according to claim 1, wherein the state change in the network pertains to at least one of the following:
a change in a state of at least one server,
removal of a server from the plurality of servers constituting the network, and
addition of a server to the plurality of servers constituting the network.

12. The method of claim 1, wherein determining a state change in a network comprises:
starting a timer upon determination of the state change; and
checking the state again upon expiry of the timer,
wherein the state change is confirmed if the state when the timer starts is the same as after expiry of the timer.

13. The method according to claim 1, wherein the generating is based on the calculated first lookup table, and based on at least one partition of the second lookup table respectively allocated to at least one server among the plurality of servers prior to a detected state change in the network.

14. A method, comprising:
receiving, at an active server among a plurality of servers, a first look up table indicating respective partitions of a second lookup table distributed among the plurality of servers;
generating, at the active server, a modified partition of the second lookup table based on the first lookup table.

15. The method according to claim 14, comprising
sending a first acknowledgement to a master server upon completion of generating the modified partition of the second lookup table.

16. The method of claim 15, comprising:
receiving a lock command, and locking the active server responsive thereto;
upon receiving the lock command, completing on-going writing operations; and
upon completion of the on-going writing operations, sending a second acknowledgement indicating that the active server is locked to the master server, wherein writing operations are prohibited when the active server is locked.

17. The method of claim 16, further comprising:
receiving a switch command; upon receipt of the switch command, switching to the received first lookup table and the generated modified partition of the second lookup table, and upon completion of the switching, sending a third acknowledgement to the master server.

18. The method according to claim 14, wherein the generating is based on the received first lookup table, and based on at least one partition of the second lookup table respectively allocated to at least one server among the plurality of servers prior to a state change.

19. A server, comprising:
an interfacing unit; and
a processor configured to
determine a state change in a network comprising the server as a master server among a plurality of servers,
calculate a first lookup table, said first lookup table indicating respective partitions of a second lookup table distributed among active servers of said plurality of servers,
distribute the calculated first lookup table to each active server via said interfacing unit, and
based on the first lookup table generate a modified partition of the second lookup table.

20. The server of claim 19, wherein the processor for calculating the first lookup table, is configured to
allocate partitions of the second lookup table to active servers, wherein
respective partitions of the second lookup table allocated to each active server equal each other in terms of size, wherein the size is defined by a difference between a start address value and an end address value, or
differ from each other in terms of size
in proportion to a respective processing capacity of each of said active servers, or
in such a manner that a processing load for each of the active servers equals each other.

21. The server according to claim 20, wherein the first lookup table comprises at least a pair of data, wherein each pair of data comprises
an address of an active server and
an address partition representing a partition of the second lookup table and defined by a start address value and an end address value, and further comprises mapping information between the first lookup table after and before the detected state change.

22. The server according to claim 21, wherein the number of data pairs contained in the first lookup table depends on the number of active servers.

23. The server according to claim 20, wherein the processor, for allocating partitions of the second lookup table to active servers, is configured to:
re-divide an address space that is formed by the plurality of address partitions of the second lookup table managed by the respective active servers, among a number of the active servers after a detected state change, thereby obtaining a respective modified partition of the second lookup table for each active server.

24. The server according to claim 23, wherein the processor for re-dividing the address space, is configured to:
shift at least one of the start address value and the end address value of the partition of at least one active server by a respective address shift amount.

25. The server according to claim 24, wherein the processor is further configured to validate the address shift amount after re-dividing.

26. The server of claim 19, wherein the processor is further configured to:
  collect first acknowledgements, via said interfacing unit, from each active server indicating that generating modified partitions of the second lookup table at each active servers is completed,
  issue a lock command to each active server in the network via said interfacing unit upon collecting the first acknowledgements, and
  collect, via said interfacing unit, second acknowledgements from each active server indicating that it is locked, wherein writing operations are prohibited when a server is locked.

27. The server of claim 26, the processor further configured to:
  issue a switch command to each active server in the network via said interfacing unit upon collecting the second acknowledgements, and
  collect, via said interfacing unit, third acknowledgements from each active server indicating that each said server switches to the first lookup table and the modified partition of the second look up table.

28. The server of claim 27, wherein the processor is further configured to:
  issue an unlock command to each active server in the network via said interfacing unit upon collecting the third acknowledgements.

29. The server according to claim 19, wherein the state change in the network pertains to at least one of the following:
  a change in a state of at least one server,
  removal of a server from the plurality of servers constituting the network, and
  addition of a server to the plurality of servers constituting the network.

30. The server of claim 19, wherein the processor for determining a state change in the network, is configured to:
  start a timer upon determination of the state change; and
  check the state again upon expiry of the timer, wherein the processor is configured to confirm the state change if the state when the timer starts is the same as after expiry of the timer.

31. The server according to claim 19, wherein the processor is configured to generate the modified partition of the second lookup table based on the calculated first lookup table, and based on at least one partition of the second lookup table respectively allocated to at least one server among the plurality of servers prior to a detected state change in the network.

32. A server, comprising:
  an interfacing unit configured to receive a first look up table indicating respective partitions of a second lookup table distributed among a plurality of servers including the server as an active server; and
  a processor configured to generate a modified partition of the second lookup table based on the first lookup table.

33. The server according to claim 32, wherein the processor is configured to cause the interfacing unit to send a first acknowledgement to a master server upon completion of generating the modified partition of the second lookup table.

34. The server of claim 33, wherein
  the interfacing unit is configured to receive a lock command,
  upon receiving the lock command, the processor is configured to lock the server responsive thereto and to complete on-going writing operations, and upon completion of the on-going writing operations, to cause the interfacing unit to send a second acknowledgement to the master server indicating that the active server is locked, wherein writing operations are prohibited when the active server is locked.

35. The server of claim 34, wherein
  the interfacing unit is configured to receive a switch command,
  the processor is configured to switch, upon receipt of the switch command, to the received first lookup table and the generated modified partition of the second lookup table, and upon completion of the switching, to cause the interfacing unit to send a third acknowledgement to the master server.

36. The server according to claim 32, wherein the processor is configured to generate the modified partition of the second lookup table based on the received first lookup table, and based on at least one partition of the second lookup table respectively allocated to at least one server among the plurality of servers prior to a state change.

37. A system comprising:
  (a) a server comprising:
    an interfacing unit; and
    a processor configured to
      determine a state change in a network comprising the server as a master server among a plurality of servers,
      calculate a first lookup table, said first lookup table indicating respective partitions of a second lookup table distributed among active servers of said plurality of servers,
      distribute the calculated first lookup table to each active server via said interfacing unit, and
      based on the first lookup table generate a modified partition of the second lookup table; and
  (b) at least one server comprising:
    an interfacing unit configured to receive a first look up table indicating respective partitions of a second lookup table distributed among a plurality of servers including the server as an active server; and
    a processor configured to generate a modified partition of the second lookup table based on the first lookup table.

38. A computer program embodied on a computer readable storage medium comprising processor implementable instructions for performing the following method steps:
  determining a state change in a network comprising a master server among a plurality of servers;
  calculating, at the master server, a first lookup table, said first lookup table indicating respective partitions of a second lookup table distributed among active servers of said plurality of servers;
  distributing the calculated first lookup table to each active server; and
  based on the first lookup table, generating, at the master server, a modified partition of the second lookup table.

* * * * *